United States Patent
Hiramoto et al.

(10) Patent No.: US 8,965,996 B2
(45) Date of Patent: Feb. 24, 2015

(54) COMMUNICATION APPARATUS, INFORMATION PROCESSING APPARATUS, AND METHOD FOR CONTROLLING COMMUNICATION APPARATUS

(75) Inventors: Shinya Hiramoto, Kawasaki (JP); Yuichiro Ajima, Kawasaki (JP); Tomohiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 13/007,288

(22) Filed: Jan. 14, 2011

(65) Prior Publication Data
US 2011/0185032 A1 Jul. 28, 2011

(30) Foreign Application Priority Data

Jan. 25, 2010 (JP) ................................ 2010-013609

(51) Int. Cl.
G06F 15/167 (2006.01)
G06F 15/16 (2006.01)
G06F 9/54 (2006.01)
H04L 29/08 (2006.01)

(52) U.S. Cl.
CPC ............ *G06F 9/544* (2013.01); *H04L 67/1097* (2013.01)
USPC .......................................... 709/212; 711/201

(58) Field of Classification Search
CPC ............ G06F 12/0866; G06F 12/0804; G06F 12/0862; G06F 9/383
USPC ........... 709/211, 212; 711/113, 137, 171, 201
See application file for complete search history.

(56) References Cited

U.S. PATENT DOCUMENTS

| 5,522,062 | A | * | 5/1996 | Yamaki | 711/172 |
| 5,878,252 | A | * | 3/1999 | Lynch et al. | 712/225 |
| 6,594,712 | B1 | * | 7/2003 | Pettey et al. | 710/22 |
| 6,675,200 | B1 | * | 1/2004 | Cheriton et al. | 709/212 |
| 6,694,392 | B1 | * | 2/2004 | Haren | 710/65 |

(Continued)

FOREIGN PATENT DOCUMENTS

| JP | 2005-182491 A | 7/2005 |
| WO | 99/34273 A2 | 7/1999 |

OTHER PUBLICATIONS

IBM. (Jul. 18, 2005). Real addressing mode for RDMA operations. 2 pp. Retrieved from http://www.ip.com/pubview/IPCOM000126449D.*

(Continued)

*Primary Examiner* — Lynn Feild
*Assistant Examiner* — Timothy Sowa
(74) *Attorney, Agent, or Firm* — Fujitsu Patent Center

(57) ABSTRACT

A communication apparatus including: a receiving portion that receives alignment specifying information, the alignment specifying information indicating which of main memories included in a first information processing apparatus and a second information processing apparatus to align the requested data; a division location calculating portion that calculates a divisional location of the requested data so that the divisional location of the requested data becomes an alignment boundary on the main memory included in any one of the first and the second information processing apparatuses specified by the received alignment specifying information, the alignment boundary being integral multiples of a given data width; and a transmitting portion that divides the requested data stored into the main memory in the second information processing apparatus based on the calculated divisional location, and transmits the divided data to the first information processing apparatus.

10 Claims, 17 Drawing Sheets

(56) References Cited

U.S. PATENT DOCUMENTS

| | | |
|---|---|---|
| 6,754,780 B1 * | 6/2004 | Carlson et al. ............... 711/137 |
| 6,823,403 B2 * | 11/2004 | Gulick et al. ................. 710/22 |
| 6,851,035 B1 * | 2/2005 | Zhou et al. ................... 711/201 |
| 7,386,699 B1 * | 6/2008 | Bishara ........................ 711/201 |
| 7,870,361 B1 * | 1/2011 | Bishara ........................ 711/201 |
| 7,937,508 B2 * | 5/2011 | Dierks et al. ................. 710/34 |
| 7,944,920 B2 * | 5/2011 | Pandya ........................ 370/392 |
| 7,953,085 B2 * | 5/2011 | Chang et al. ................. 370/390 |
| 2005/0015549 A1 | 1/2005 | Dierks, Jr. et al. |
| 2005/0141444 A1 | 6/2005 | Hirai |
| 2005/0257008 A1 * | 11/2005 | Nakajima et al. ............. 711/118 |
| 2006/0059242 A1 * | 3/2006 | Blackmore et al. ........... 709/211 |
| 2006/0095611 A1 * | 5/2006 | Winchester et al. ........... 710/52 |
| 2008/0235484 A1 | 9/2008 | Tal et al. |
| 2010/0183024 A1 * | 7/2010 | Gupta .......................... 370/463 |
| 2013/0151646 A1 * | 6/2013 | Chidambaram et al. ...... 709/213 |

OTHER PUBLICATIONS

Extended European Search Report of EP Patent Application 11151587.0 dated Mar. 28, 2014.

* cited by examiner

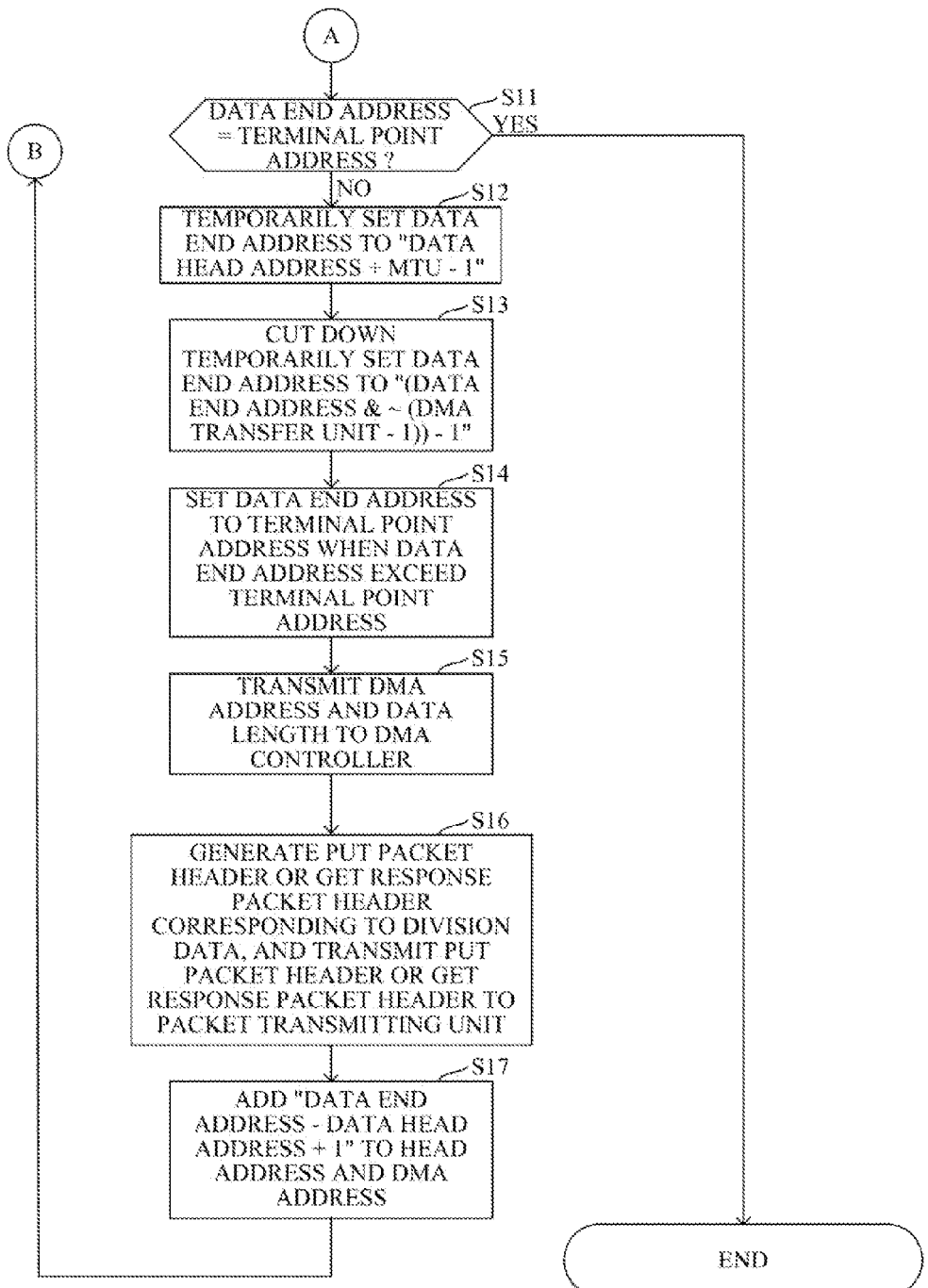

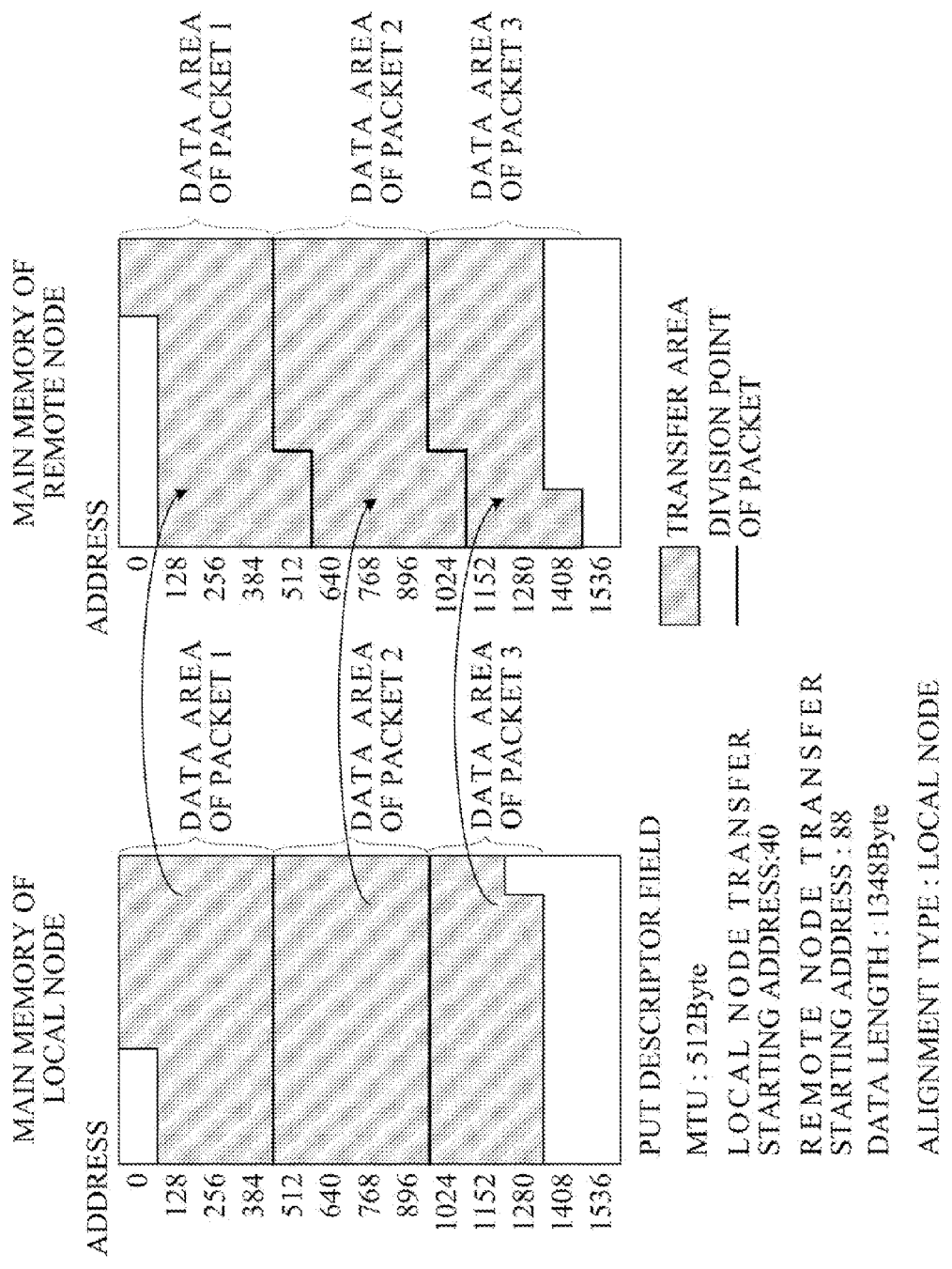

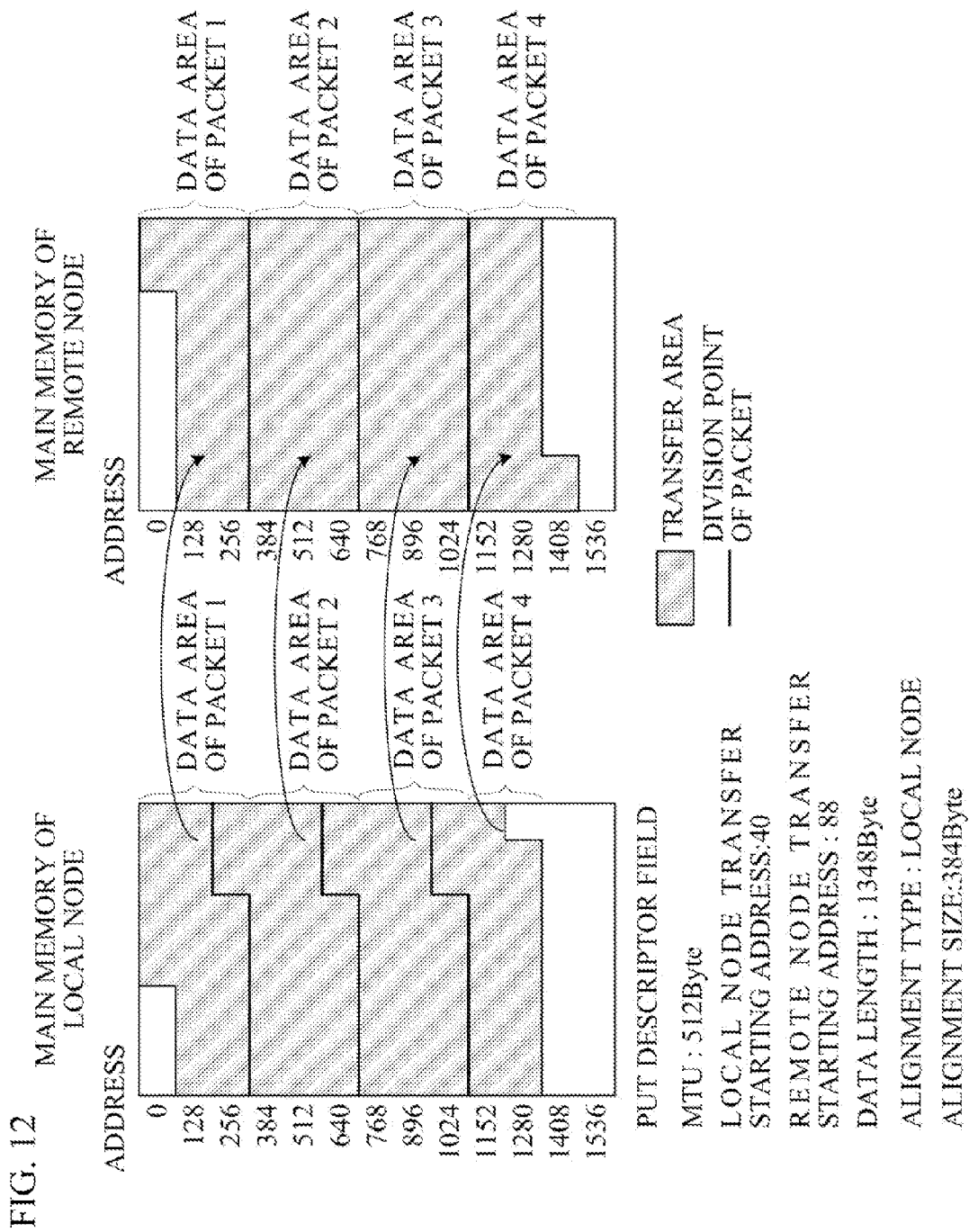

COMMUNICATION APPARATUS, INFORMATION PROCESSING APPARATUS, AND METHOD FOR CONTROLLING COMMUNICATION APPARATUS

CROSS-REFERENCE TO RELATED APPLICATION

This application is based upon and claims the benefit of priority of the prior Japanese Patent Application No. 2010-013609, filed on Jan. 25, 2010, the entire contents of which are incorporated herein by reference.

FIELD

A certain aspect of the embodiments discussed herein is related to a communication apparatus, an information processing apparatus, and a method for controlling the communication apparatus.

BACKGROUND

Conventionally, there has been known a technique that executes RDMA (Remote Direct Memory Access) communication between a local node and a remote node.

FIG. 1 illustrates an example of a case where data is transmitted from a main memory of the local node to a main memory of the remote node (i.e., an example of Put communication). In the example of FIG. 1, a transfer unit of DMA (Direct Memory Access) is 128 bytes. As to a transfer starting address specified by a processor, the local node is 40 and the remote node is 88. It is assumed that data length is 1348 bytes, and MTU (Maximum Transmission Unit; maximum transmission size per one packet) is 512 bytes. In this example, data is divided into three packets, the three packets are transmitted to the main memory of the remote node. However, in both main memories of the local node and the remote node, data areas of packets 1 to 3 are not aligned according to a DMA transfer unit. Therefore, the data is read and written in every 128 bytes from the head of the data, so that data transfer efficiency about reading and writing the data deteriorates.

For example, when data on the packet 1 is read out from the main memory of the local node, a processor of the local node needs to read out data of 128 bytes from address ranges 0 to 127 and 128 to 255, respectively, in order to read out data of an address range 40 to 167. Further, to read out data of an address range 168 to 295, the processor of the local node needs to read out data of 128 bytes from address ranges 128 to 255 and 256 to 383, respectively. Thus, the processor of the local node reads out data twice from the same addresses (i.e., address range 128 to 255), so that the efficiency of reading the data deteriorates. With respect to addresses subsequent to an address 256, the processor of the local node similarly reads out data twice from the same addresses.

Similarly, when the data on the packet 1 is written in the main memory of the remote node, the efficiency of writing the data deteriorates. For example, when the data on the packet 1 is written in the main memory of the remote node, a processor of the remote node needs to write data of 128 bytes in address ranges 0 to 127 and 128 to 255, respectively, in order to write data in an address range 88 to 215. To write data in an address range 216 to 343, the processor of the remote node needs to write data of 128 bytes in address ranges 128 to 255 and 256 to 383, respectively. Thus, the processor of the remote node writes data twice in the same addresses (i.e., address range 128 to 255), so that the efficiency of writing the data deteriorates. With respect to addresses subsequent to an address 256, the processor of the remote node similarly writes data twice in the same addresses. Moreover, when data is written for the second time, previously written data needs to be not overwritten.

Conventionally, there has been known a division method and a system in which a head of an I/O request (Input Output request) such as received read/write is divided according to a boundary of a cache line, and a subsequent I/O request is aligned on another cache line.

FIG. 2 illustrates a result of applying a division method, in which the above-mentioned head of the I/O request is divided according to the boundary of the cache line, and the subsequent I/O request is aligned on another cache line, to the example of the Put communication in FIG. 1.

When the local node reads out the data on the packet 1, a head section of the packet 1 is divided at a boundary between addresses 127 and 128, and a remaining section of the packet 1 is divided so as to align on 128 bytes boundaries. Thereby, except for the head and an end of the packet 1, data on the packet 1 is aligned on the 128 bytes boundaries. Therefore, when data of one packet is read out, the same addresses are not read out twice.

When the remote node writes the data on the packet 1, the head section of the packet 1 is divided at the boundary between addresses 127 and 128, and the remaining section of the packet 1 is divided so as to align on 128 bytes boundaries. Thereby, except for the head and the end of the packet 1, data on the packet 1 is aligned on the 128 bytes boundaries. Therefore, when data of one packet is written, the data is not written in the same addresses twice.

However, in the above-mentioned division method in which the above-mentioned head of the I/O request is divided according to the boundary of the cache line, and the subsequent I/O request is aligned on another cache line, the data transfer efficiency about reading and/or writing data from/in addresses including a divisional point of the packets deteriorates. For example, when the local node reads out data on the end of the packet 1, the processor of the local node reads out data of 128 bytes from an address range 512 to 639. When the local node reads out data on the head of the packet 2, the processor of the local node reads out data of 128 bytes from the address range 512 to 639. Thus, the processor of the local node needs to read out the data twice from the address range (address range 512 to 639) including the divisional point of the packets. Similarly, when the remote node writes the data on the end of the packet 1 and the data on the head of the packet 2, the processor of the remote node needs to write the data twice in the address range 512 to 639.

SUMMARY

According to an aspect of the present invention, there is provided a communication apparatus that is connected to a second information processing apparatus that transmits data requested from a first information processing apparatus, the communication apparatus including: a receiving portion that receives alignment specifying information, the alignment specifying information indicating which of main memories included in the first information processing apparatus and the second information processing apparatus to align the requested data; a division location calculating portion that calculates a divisional location of the requested data so that the divisional location of the requested data becomes an alignment boundary on the main memory included in any one of the first and the second information processing apparatuses specified by the received alignment specifying information, the alignment boundary being integral multiples of a given data width; and a transmitting portion that divides the requested data stored into the main memory in the second information processing apparatus based on the calculated divisional location, and transmits the divided data to the first information processing apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 6A and 6B are a flowchart illustrating a process executed by a division location calculating unit;

FIG. 7 is a diagram illustrating a division method of data when an alignment type is a local node in the Put communication;

FIG. 12 is a diagram illustrating a division method of data when the alignment type is the remote node in the Put communication;

DESCRIPTION OF EMBODIMENTS

A description will now be given, with reference to the accompanying drawings, of an exemplary embodiment relating to a communication apparatus, an information processing apparatus, a method for controlling the communication apparatus, and a non-transitory computer readable recording medium.

First, a description will now be given of definition of terms used in the following embodiments. A local node indicates a node such as an information processing apparatus requesting communication in inter-node communication. A remote node indicates a node such as an information processing apparatus receiving a communication request from the local node in the inter-node communication. RDMA communication indicates a communication method in which the local node itself specifies a main memory of the local node and a main memory of the remote node, and data transfer is executed between the specified main memories. The RDMA communication includes Put communication that transmits data in the local node to the remote node, and Get communication that transmits data in the remote node to the local node. A Get request packet indicates a packet which the local node transmits to the remote node in the Get communication. The Get request packet has information on transfer areas of the local node and the remote node. A Get response packet indicates a packet which the remote node transmits to the local node in the Get communication. The Get response packet has data specified by the Get request packet. A descriptor indicates a command used when a processor as an arithmetic processing apparatus such as a CPU (Central Processing Unit) transmits beginning of a process to a network interface apparatus as a communication apparatus, or a command used when the network interface apparatus transmits completion of the process to the processor. The descriptor has information on a type of the process, and information on a transfer area or the like when the process is data transfer.

Figure 1:
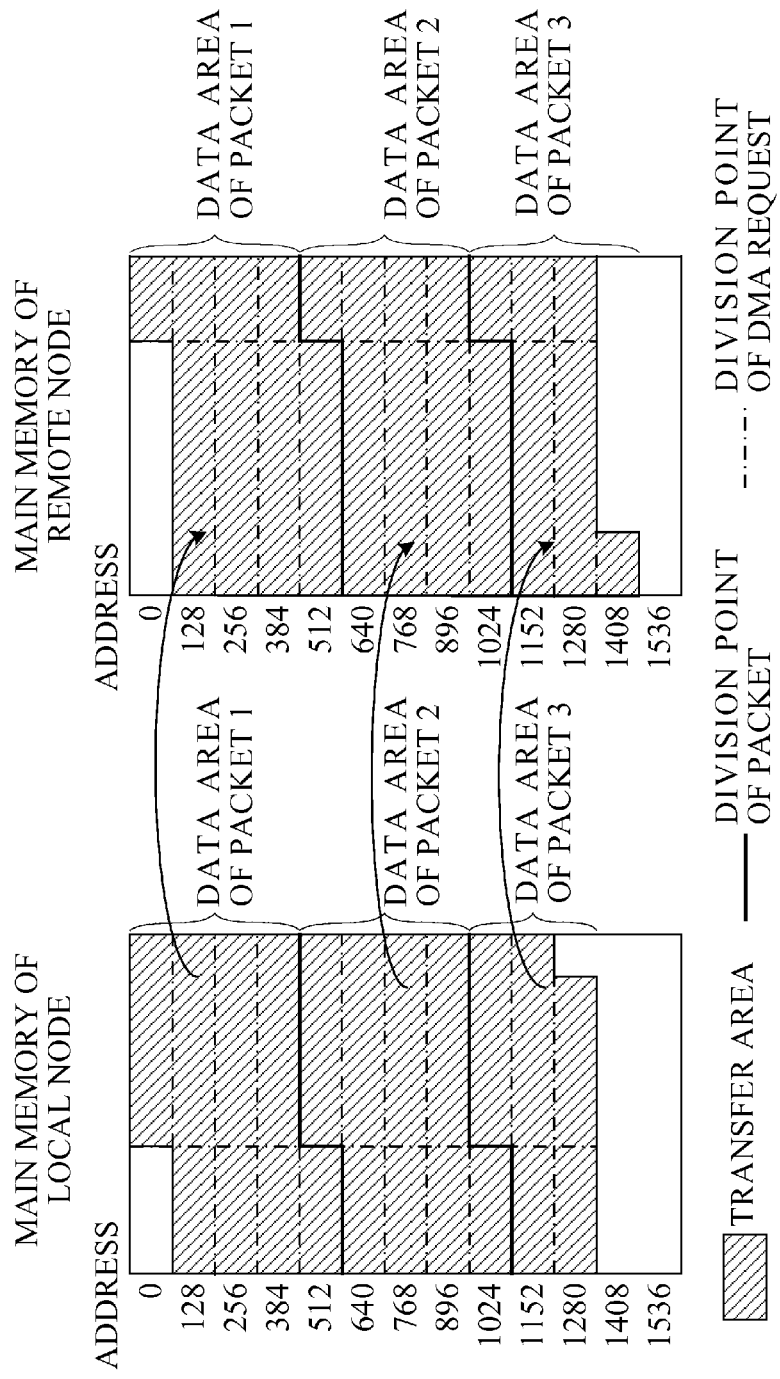
FIG. 1 is a diagram illustrating an example of a case where data is transmitted from a main memory of a local node to a main memory of a local node (i.e., an example of Put communication)
Figure 2:
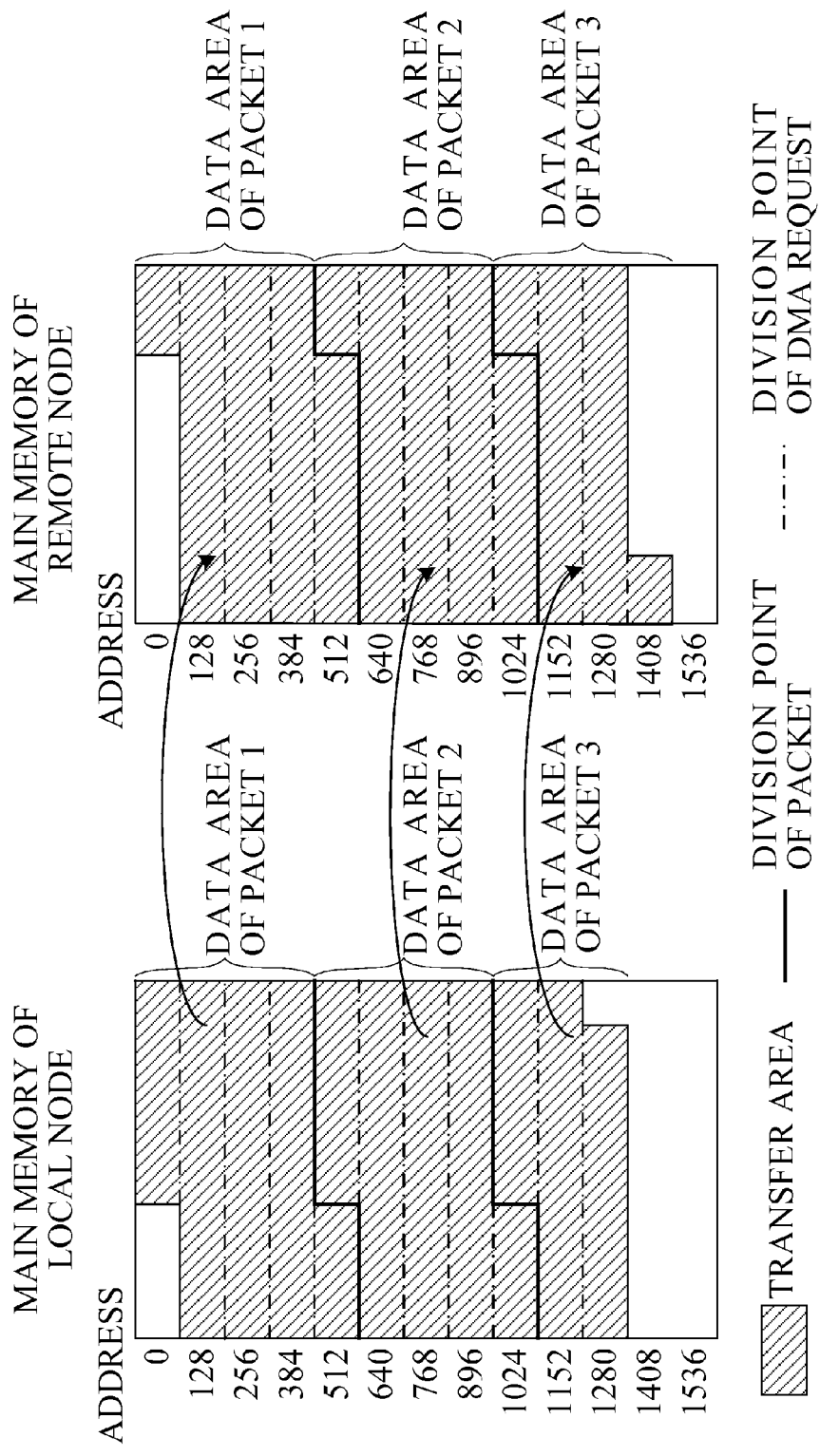
FIG. 2 is a diagram illustrating a result of applying a division method of U.S. Patent Publication No. 2008/0235484 to the example of FIG. 1.
Figure 3:
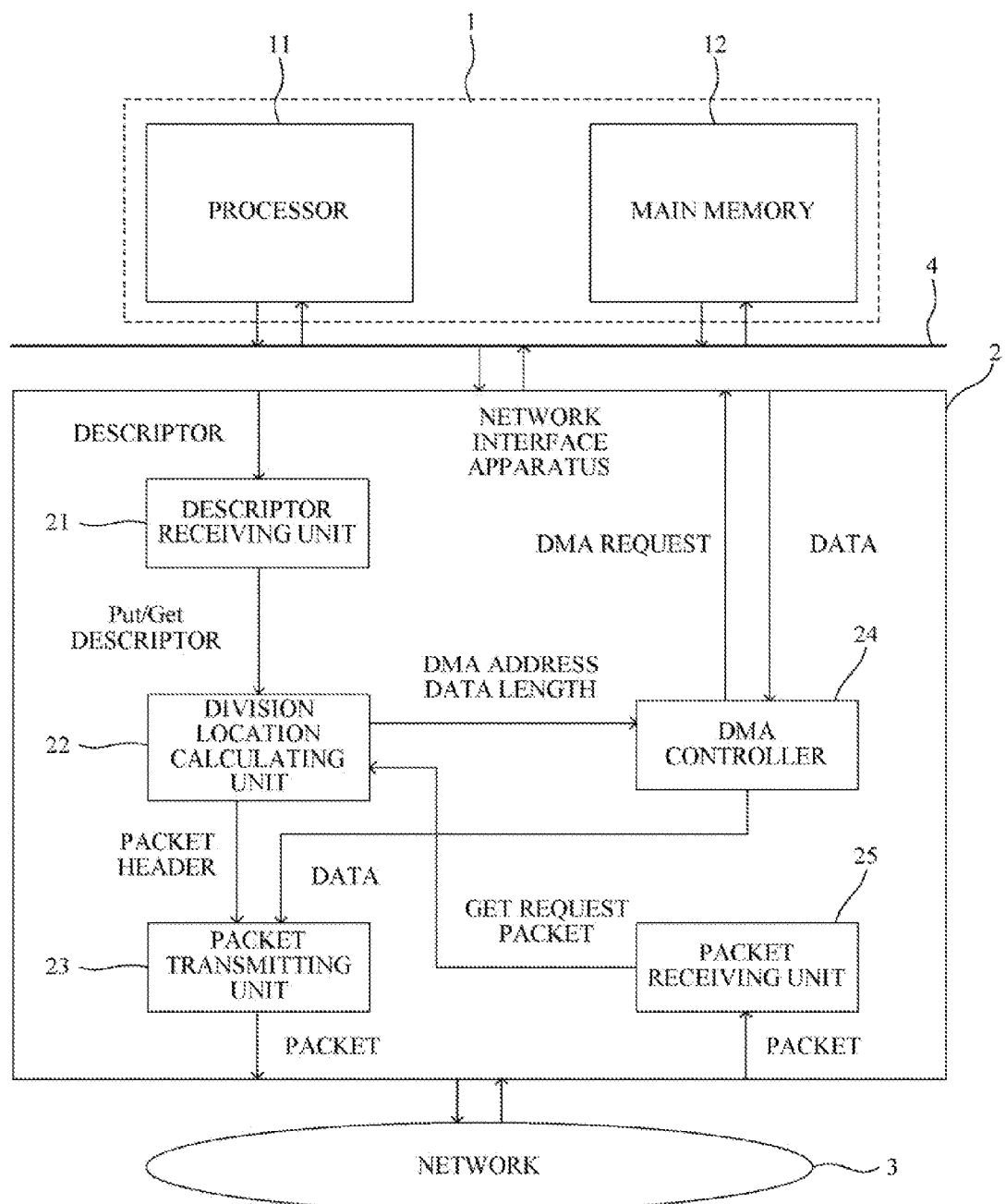
FIG. 3 is a diagram illustrating a construction of a network interface apparatus according to a first embodiment.
Figure 4:
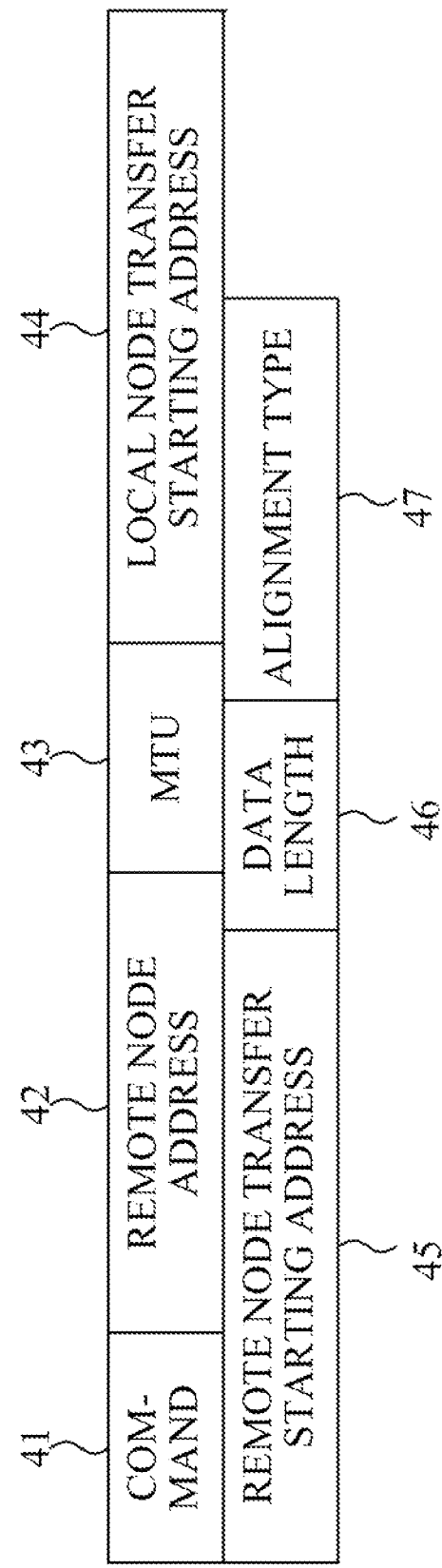
FIG. 4 is a diagram illustrating a format of a descriptor.
Figure 5:
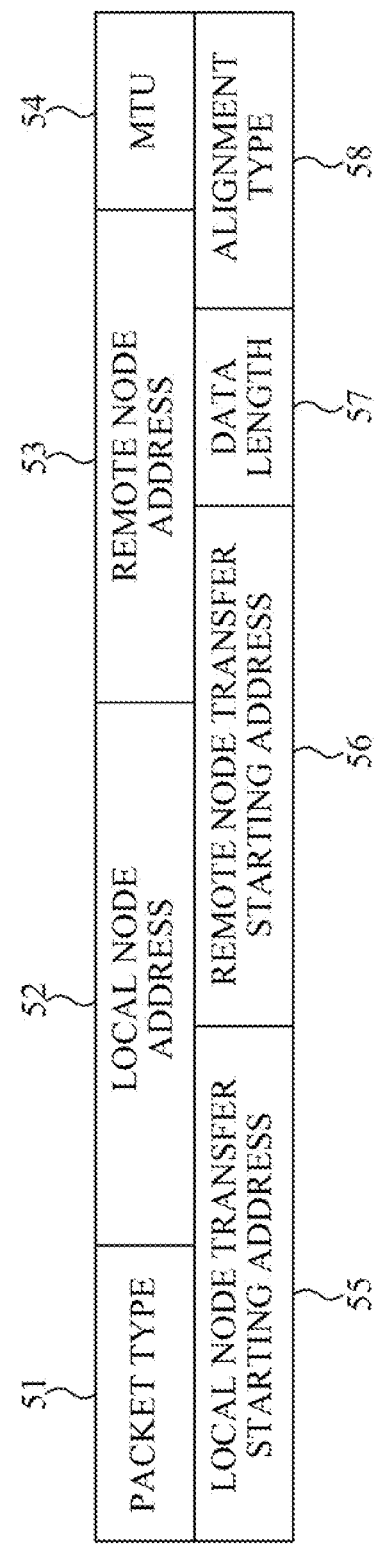
FIG. 5 is a diagram illustrating a format of a Get request packet.

FIG. 3 is a diagram illustrating a construction of the network interface apparatus according to a first embodiment. FIG. 4 is a diagram illustrating a format of the descriptor. FIG. 5 is a diagram illustrating a format of the Get request packet.

In FIG. 3, a node 1 is connected to a network 3 via a network interface apparatus 2. The node 1 is connected to another node, not shown, via the network 3. When the node 1 requests communication to another node, the node 1 becomes the local node. When the node 1 receives a communication request from another node, the node 1 becomes the remote node.

The node 1 includes: a processor 11 that controls the operation of the whole node 1, writing data in a main memory 12, and reading out data from the main memory 12; and the main memory 12 that stores data of a packet, and the descriptor. The node 1 is connected to the network interface apparatus 2 via a bus 4.

The network interface apparatus 2 includes a descriptor receiving unit 21, a division location calculating unit 22, a packet transmitting unit 23, a DMA controller 24, and a packet receiving unit 25. The descriptor receiving unit 21, the packet transmitting unit 23, and the packet receiving unit 25 are composed of an input/output circuit, not shown. The division location calculating unit 22 and the DMA controller 24 are composed of a microcomputer, not shown, and the like.

The descriptor receiving unit 21 receives the descriptor from the main memory 12, and transmits the descriptor to the division location calculating unit 22. The packet receiving unit 25 receives a packet from the remote node. When the packet is the Get request packet, the packet receiving unit 25 transmits the packet to the division location calculating unit 22. The division location calculating unit 22 calculates divisional locations of the data based on the descriptor or the Get request packet, and transmits a DMA address and a data length of each division data to the DMA controller 24. The DMA address indicates a head address of each division data. Further, the division location calculating unit 22 generates packet headers corresponding to each division data, and transmits the packet headers to the packet transmitting unit 23. The DMA controller 24 transmits a DMA request to the node 1 based on the received DMA address and the received data length, reads out each division data from the main memory 12, and transmits each division data to the packet transmitting unit 23. That is, the DMA controller 24 divides data based on the received DMA address and the received data length. The packet transmitting unit 23 creates a packet based on the packet header and the division data from the DMA controller 24, and transmits the packet to the remote node. A detailed calculation method of divisional locations of the data based on the descriptor or the Get request packet by the division location calculating unit 22 is explained in FIGS. 6A and 6B described later.

In FIG. 4, the descriptor includes fields of a command 41, a remote node address 42, a MTU 43, a local node transfer starting address 44, a remote node transfer starting address 45, a data length 46, and an alignment type 47. The command 41 specifies a type of communication such as "Put" or "Get". The remote node address 42 specifies an address of the remote node on the network. The MTU 43 specifies a maximum transmission size per one packet. The local node transfer starting address 44 specifies a data transfer starting address of the local node. The remote node transfer starting address 45 specifies a data transfer starting address of the remote node. The data length 46 specifies the length of data to be transferred. The alignment type 47 specifies which address of the main memories included in the local node and the remote node to align data. Here, when the "Put" communication is specified by the command 41, the descriptor is called "Put descriptor". When the "Get" communication is specified by the command 41, the descriptor is called "Get descriptor". The descriptor is created by a programmer or the like, and plural descriptors are stored into the main memory 12.

In FIG. 5, the Get request packet includes fields of a packet type 51, a local node address 52, a remote node address 53, a MTU 54, a local node transfer starting address 55, a remote node transfer starting address 56, a data length 57, and an alignment type 58. The packet type 51 specifies a type of a packet such as the Get request packet. The local node address 52 specifies an address of the local node on the network. The remote node address 53 specifies an address of the remote node on the network. The MTU 54 specifies a maximum transmission size per one packet. The local node transfer starting address 55 specifies a data transfer starting address of the local node. The remote node transfer starting address 56 specifies a data transfer starting address of the remote node. The data length 57 specifies the length of data to be transferred. The alignment type 58 specifies which address of the main memories included in the local node and the remote node to align data.

The alignment type 47 in FIG. 4 and the alignment type 58 in FIG. 5 are provided so that the processor 11 can select which address of the main memories included in the local node and the remote node to align data. For example, when a single local node acquires data from plural remote nodes in the Get communication, there are a lot of writing frequencies of the data by the local node. Therefore, if the local node is specified as the alignment type, the data can be aligned on the address of the main memory in the local node, and hence the writing efficiency of the data improves. On the contrary, when a single remote node transmits data to plural local nodes, there are a lot of reading frequencies of the data by the remote node. Therefore, if the remote node is specified as the alignment type, the data can be aligned on the address of the main memory in the remote node, and hence the reading efficiency of the data improves.

Here, a description will now be given of the operation of the network interface apparatus 2 in the case of the Put communication and the Get communication.

In the case of the Put communication, the descriptor receiving unit 21 receives the Put descriptor from the main memory 12 of the local node. The descriptor receiving unit 21 transmits the local node transfer starting address 44, the remote node transfer starting address 45, the data length 46, and the alignment type 47 in the Put descriptor to the division location calculating unit 22. The division location calculating unit 22 calculates divisional locations of the data based on values of these fields, and transmits the DMA address and the data length of each division data to the DMA controller 24. The division location calculating unit 22 generates packet headers corresponding to each division data, and transmits the packet headers to the packet transmitting unit 23. The DMA controller 24 transmits the DMA request to the local node, reads out each division data from the main memory 12, and transmits each division data to the packet transmitting unit 23. The packet transmitting unit 23 creates a packet based on the packet header from the division location calculating unit 22 and the division data from the DMA controller 24, and transmits the packet to the remote node.

In the case of the Get communication, the network interface apparatus near the local node transmits the alignment type 47 in the Get descriptor to the remote node with the Get request packet. The packet receiving unit 25 of the network interface apparatus near the remote node receives the Get request packet. The packet receiving unit 25 transmits the local node transfer starting address 55, the remote node transfer starting address 56, the data length 57, and the alignment type 58 of the Get request packet to the division location calculating unit 22. Then, as is the case with the Put communication, the division location calculating unit 22 calculates divisional locations of the data based on values of these fields, and transmits the DMA address and the data length of each division data to the DMA controller 24. Further, the division location calculating unit 22 generates packet headers corresponding to each division data, and transmits the packet headers to the packet transmitting unit 23. The DMA controller 24 transmits the DMA request to the remote node, reads out each division data from the main memory 12, and transmits each division data to the packet transmitting unit 23. The packet transmitting unit 23 creates a packet based on the packet header from the division location calculating unit 22 and the division data from the DMA controller 24, and transmits the packet to the local node. A detailed calculation method of divisional locations of the data based on the descriptor or the Get request packet by the division location calculating unit 22 is explained in FIGS. 6A and 6B described later.

Figure 6A:
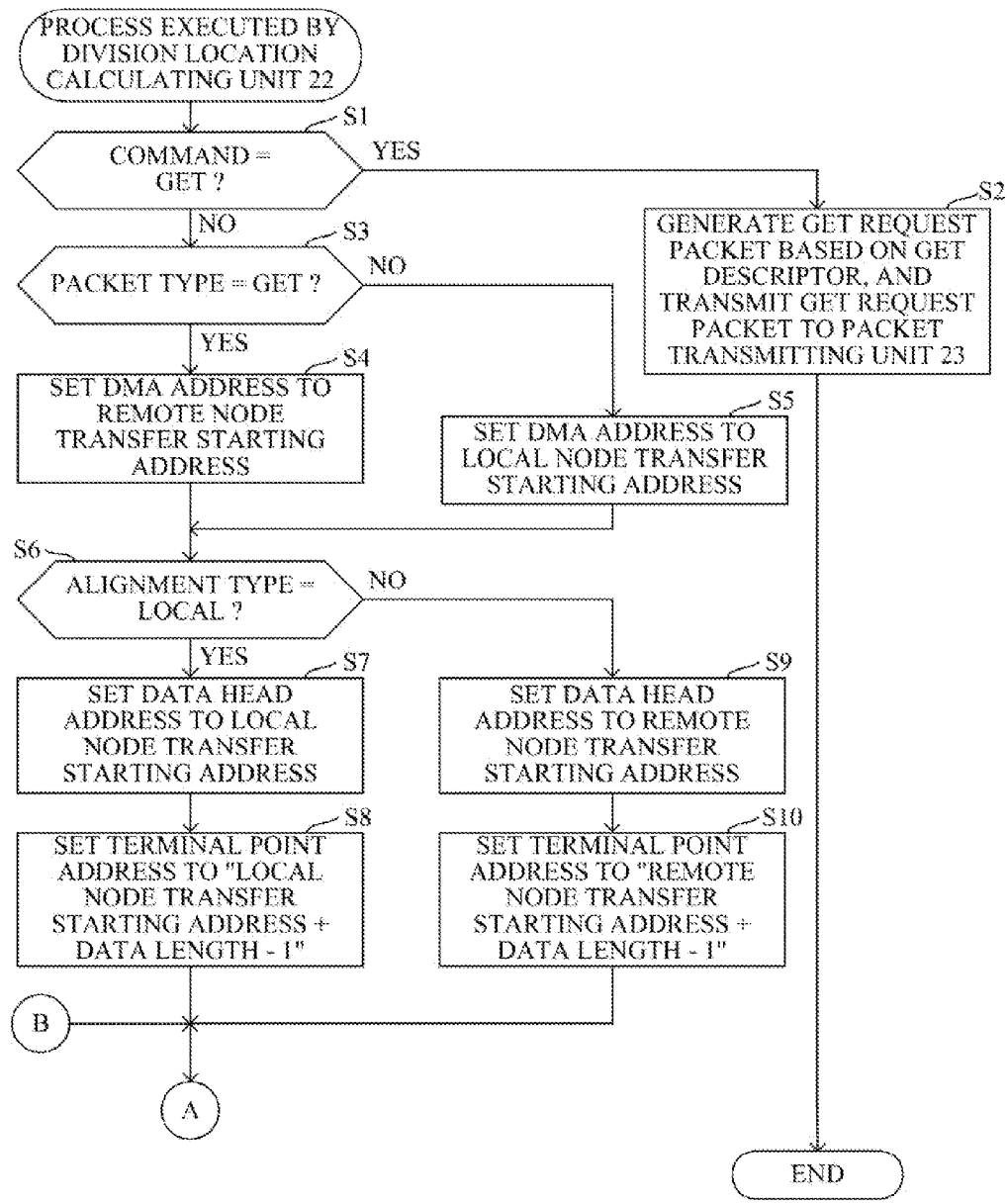

FIGS. 6A and 6B are a flowchart illustrating a process executed by the division location calculating unit 22.

The division location calculating unit 22 judges whether the command of a received descriptor is "Get" (step S1). When the command of the received descriptor is "Get" (YES in step S1), the division location calculating unit 22 near the local node does not execute a calculating process of the divisional locations, generates the Get request packet, and transmits the Get request packet to the packet transmitting unit 23 (step S2). Then, the process is terminated.

When the command of the received descriptor is not "Get" (NO in step S1), the division location calculating unit 22 sets the DMA address (i.e., head address when the division data is read out from the main memory) according to a kind of the descriptor command or the packet type. Specifically, the division location calculating unit 22 judges whether a received object is the Get request packet (step S3). When the received object is the Get request packet (YES in step S3), the division location calculating unit 22 sets the DMA address to the remote node transfer starting address of the Get request packet (step S4). When the received object is the Put descriptor (NO in step S3), the division location calculating unit 22 sets the DMA address to the local node transfer starting address of the Put descriptor (step S5).

Next, the division location calculating unit 22 sets a data head address and a terminal point address based on values of the fields of the Put descriptor or the Get request packet. Specifically, the division location calculating unit 22 judges whether the alignment type specifies the local node based on the Put descriptor or the Get request packet (step S6). The data head address indicates a head address of the division data on the main memory included in the node executing alignment. An initial division data head address is any one of the local node transfer starting address or the remote node transfer starting address. When the alignment type specifies the local node (YES in step S6), the division location calculating unit 22 sets the data head address to the local node transfer starting address (step S7). Further, the division location calculating unit 22 sets the terminal point address to a value acquired by adding "data length−1" to the local node transfer starting address (step S8). When the alignment type specifies the remote node (NO in step S6), the division location calculating unit 22 sets the data head address to the remote node transfer starting address (step S9). Further, the division location calculating unit 22 sets the terminal point address to a value acquired by adding "data length−1" to the remote node transfer starting address (step S10). Here, the terminal point address indicates an end address of the transfer area on the main memory included in the node executing alignment.

Next, the division location calculating unit 22 calculates the divisional locations of the packet by setting a data end address. Specifically, the division location calculating unit 22 judges whether the data end address is the terminal point address (step S11). The data end address indicates an end address of the division data on the main memory included in the node executing alignment. When the data end address is the terminal point address (YES in step S11), the process is terminated. When the data end address is not the terminal point address (NO in step S11), the division location calculating unit 22 temporarily sets the data end address to a value acquired by adding "MTU−1" to the data head address set by step S7 or S9 (step S12). Next, the division location calculating unit 22 cuts down the temporarily set data end address to "(data end address &~(DMA transfer unit−1))−1" (step S13). Here, "&" is an operator that executes AND operation in each bit, and "~" is an operator that executes NOT operation in each bit. According to step S13, the data end address becomes a value acquired by subtracting "1" from a multiple of the DMA transfer unit, and hence subsequent division data can be aligned according to alignment boundaries (e.g. by 128 bytes). Next, the division location calculating unit 22 sets the data end address to the terminal point address when the data end address exceeds the terminal point address (step S14).

Since the location of the division data is calculated by the above-mentioned steps, the division location calculating unit 22 executes a process for reading out the division data from the main memory 12. Specifically, the division location calculating unit 22 calculates a data length by "data end address−data head address+1", and transmits the DMA address and the data length to the DMA controller 24 (step S15). Further, the division location calculating unit 22 generates a Put packet header or a Get response packet header corresponding to the division data, and transmits the Put packet header or the Get response packet header to the packet transmitting unit 23 (step S16). The division location calculating unit 22 adds "data end address−data head address+1 (i.e., data length of division data)" to the head address and the DMA address of the data to calculate a next divisional location (step S17). The division location calculating unit 22 repeatedly executes a loop process of steps S11 to S17 until an end address of the data is equal to the terminal point address.

FIG. 7 is a diagram illustrating a division method of data when the alignment type is the local node in the Put communication.

In FIG. 7, it is assumed that the DMA transfer unit is 128 bytes. When the data is divided according to the MTU, the data area of the head packet 1 is an addresses range 40 to 551. The division location calculating unit 22 cuts down the end of the data area to "multiple of DMA transfer unit−1". Here, since the DMA transfer unit is 128 bytes, the division location calculating unit 22 cuts down the end of the data area from an address 551 to an address 511. Thereby, the data area of a subsequent packet 2 begins from an address 512, and the packet 2 is aligned according to the alignment boundaries (e.g. by 128 bytes). Then, the division location calculating unit 22 divides data of subsequent packets so that the end of the data area becomes "multiple of DMA transfer unit−1". In the example of FIG. 7, the MTU is a multiple of the DMA transfer unit. Therefore, when data is divided according to the MTU, the end of the data area becomes "multiple of DMA transfer unit−1". The data area of the packet 2 is an address range 512 to 1023, and the data area of a packet 3 is from an address 1024 to an address 1387 as an end of the transfer area. According to this division method, data other than head and end packets is aligned on the main memory in the local node according to the alignment boundaries (e.g. by 128 bytes), and hence the data can be effectively read out from the main memory.

Figure 8:
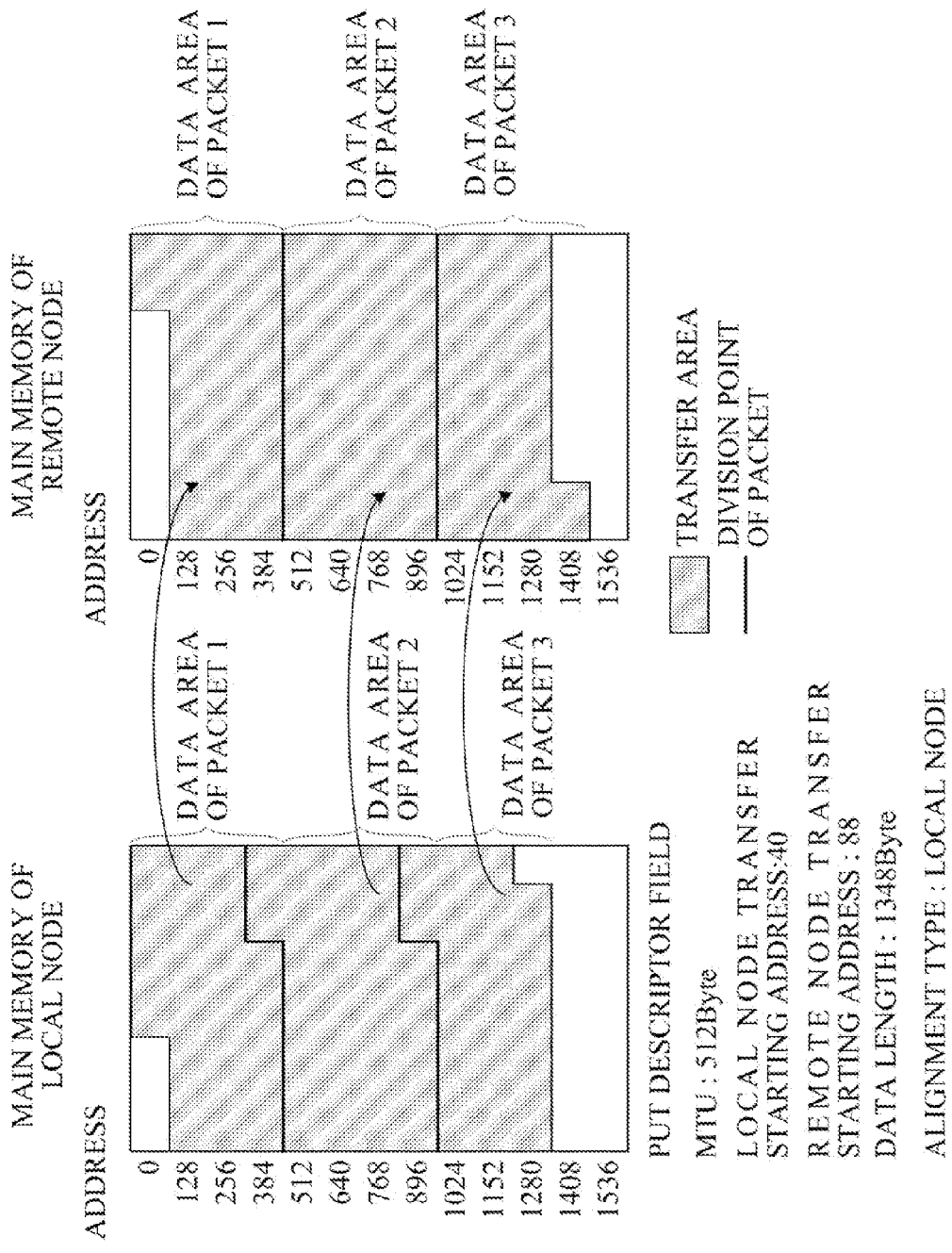
FIG. 8 is a diagram illustrating a division method of data when the alignment type is a remote node in the Put communication.

FIG. 8 is a diagram illustrating a division method of data when the alignment type is the remote node in the Put communication.

In FIG. 8, it is assumed that the DMA transfer unit is 128 bytes. When the data is divided according to the MTU, the data area of the head packet 1 is an address range 40 to 551. Since the transfer starting address of the remote node is 88, data is written in an area of the address range 88 to 599. The division location calculating unit 22 cuts down the end of the data area so that the end of the data area becomes "multiple of DMA transfer unit−1" on the main memory in the remote node. Here, since the DMA transfer unit is 128 bytes, the division location calculating unit 22 cuts down the data area on the main memory in the local node to an address range 40 to 463 so that the data area on the main memory in the remote node becomes an address range 88 to 511. Thereby, the data area of a subsequent packet 2 begins from an address 512 on the main memory in the remote node, and the packet 2 is aligned according to the alignment boundaries (e.g. by 128 bytes). Then, the division location calculating unit 22 divides the data so that the end of the data area becomes "multiple of DMA transfer unit−1" on the main memory in the remote node. In the example of FIG. 8, the MTU indicating the maximum transmission size per one packet is a multiple of the DMA transfer unit. Therefore, when data is divided according to the size indicated by the MTU, the end of the data area becomes "multiple of DMA transfer unit−1". The data area of the packet 2 is an address range 464 to 983 according to the MTU, and the data area of a packet 3 is an area from an address 984 to an address 1387. According to this division method, data other than head and end packets is align on the main memory in the remote node according to the alignment boundaries (e.g. by 128 bytes), and hence the data can be effectively written in the main memory of the remote node.

It should be noted that the DMA transfer unit, the MTU, and the field values of the Put descriptor in FIGS. 7 and 8 are one example. When the DMA transfer unit of the local node is equal to that of the remote node, the above-mentioned division methods can be always applied. A data division method in the Get communication is the same as the data division method in the Put communication except for the following points, i.e., (1) the network interface apparatus 2 near the remote node calculates the divisional locations of the data, and (2) the divisional locations of the data are calculated based on the field values of the Get request packet.

As described above, according to the first embodiment, the data to be transferred is divided into the packets so that the divisional locations of the data to be transferred become the alignment boundaries on the addresses of the main memory in the specified node. It is therefore possible to improve efficiency about reading and/or writing data from/in an address range including a divisional point.

Second Embodiment

A second embodiment differs from the first embodiment in a method for cutting down the divisional locations of the data. Although the divisional locations of the data are cut down based on the DMA transfer size in the first embodiment, the divisional locations of the data are cut down based on an alignment size specified by the descriptor in the second embodiment. The second embodiment is applied to the node such as the information processing apparatus executing the inter-node communication. Further, the second embodiment can be applied even when the alignment sizes of the local node and the remote node differ from each other in the Put communication or the Get communication. It should be noted that the construction of the network interface apparatus according to the second embodiment is the same as the construction of the network interface apparatus in FIG. 3.

A description will be given only of differences from the first embodiment.

Figure 9:
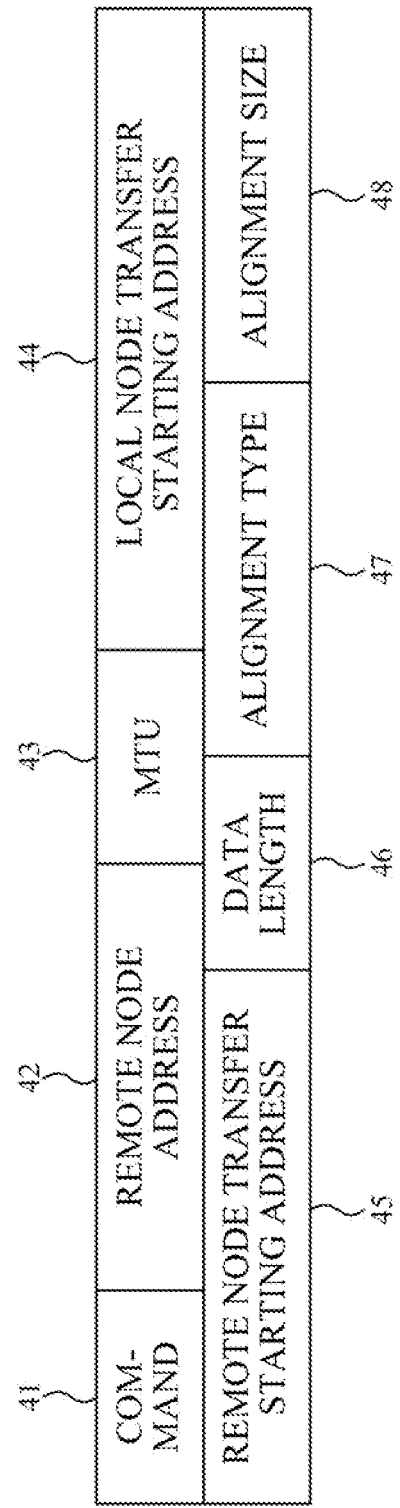
FIG. 9 is a diagram illustrating a format of a descriptor according to a second embodiment.
Figure 10:
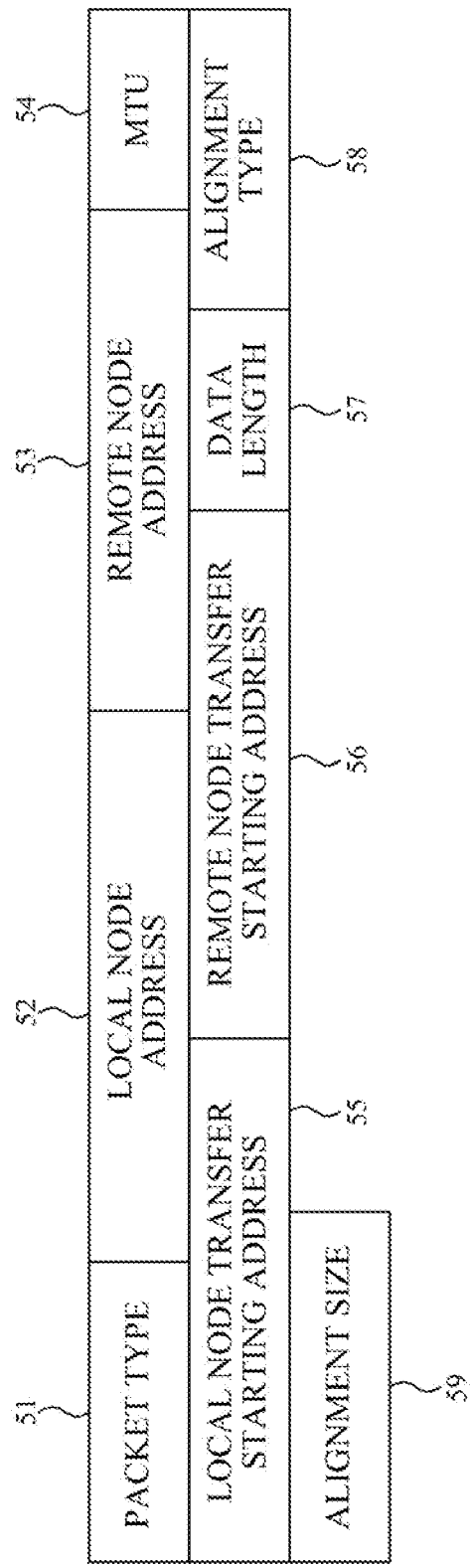
FIG. 10 is a diagram illustrating a format of the Get request packet.

FIG. 9 is a diagram illustrating a format of the descriptor according to the second embodiment. FIG. 10 is a diagram illustrating a format of the Get request packet according to the second embodiment.

In a descriptor of FIG. 9 according to the second embodiment, a field of an alignment size 48 is added to the descriptor of FIG. 4 according to the first embodiment. The alignment size 48 specifies an alignment size of the node aligning the data. Since other fields other than the alignment size 48 are the same as FIG. 4, the description of the other fields is omitted. In a Get request packet of FIG. 10 according to the second embodiment, a field of an alignment size 59 is added to the Get request packet of FIG. 5 according to the first embodiment. The alignment size 59 specifies an alignment size of the node aligning the data. Since other fields other than the alignment size 59 are the same as FIG. 5, the description of the other fields is omitted. When the alignment type is the remote node in the Put communication, the division location calculating unit 22 calculates the divisional locations of the data by using a value in the field of the alignment size 48. When the alignment type is the local node in the Get communication, the division location calculating unit 22 calculates the divisional locations of the data by using a value in the field of the alignment size 59.

Figure 11A:
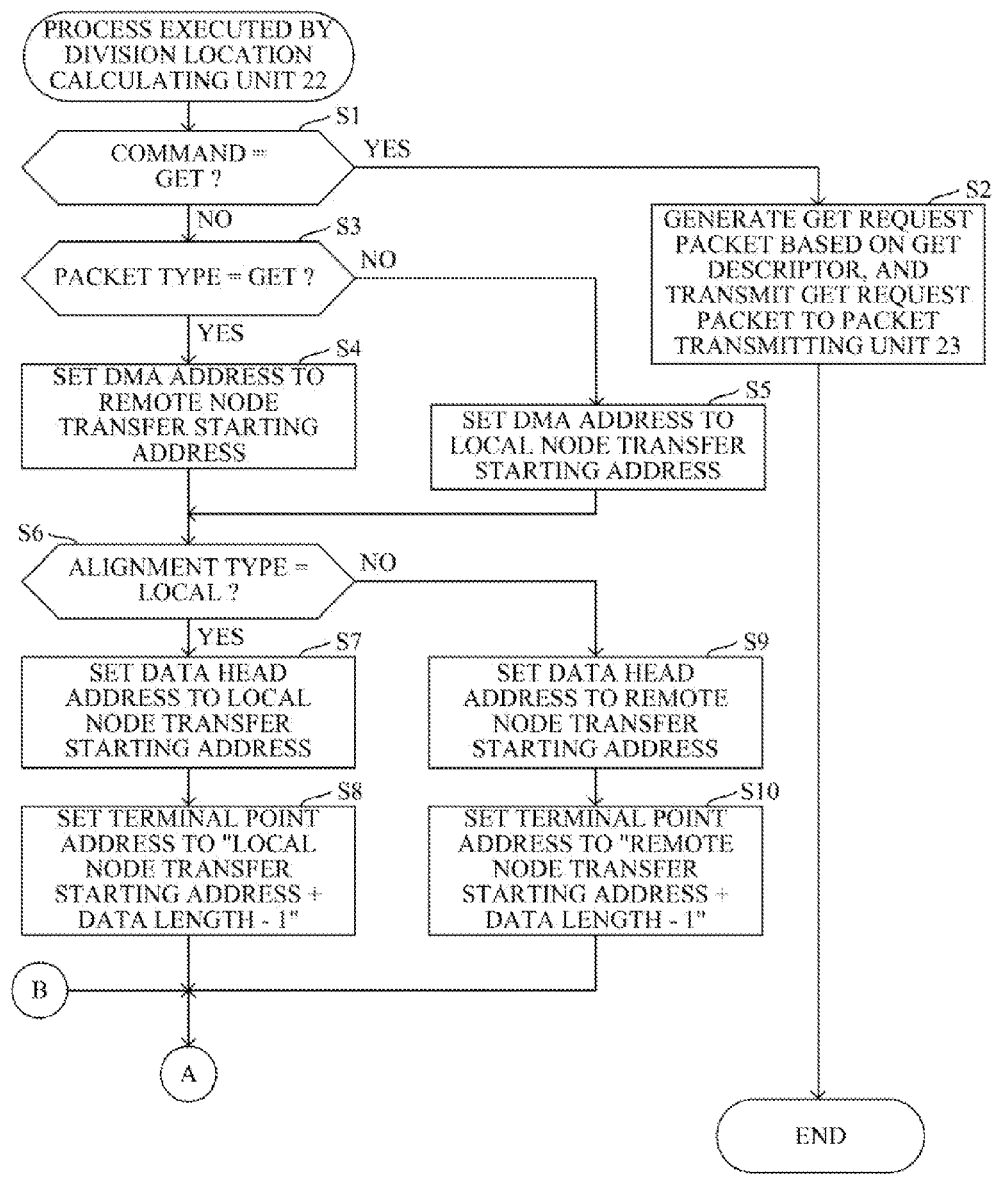
FIGS. 11A and 11B are a flowchart illustrating a process executed by the division location calculating unit.
Figure 11B:
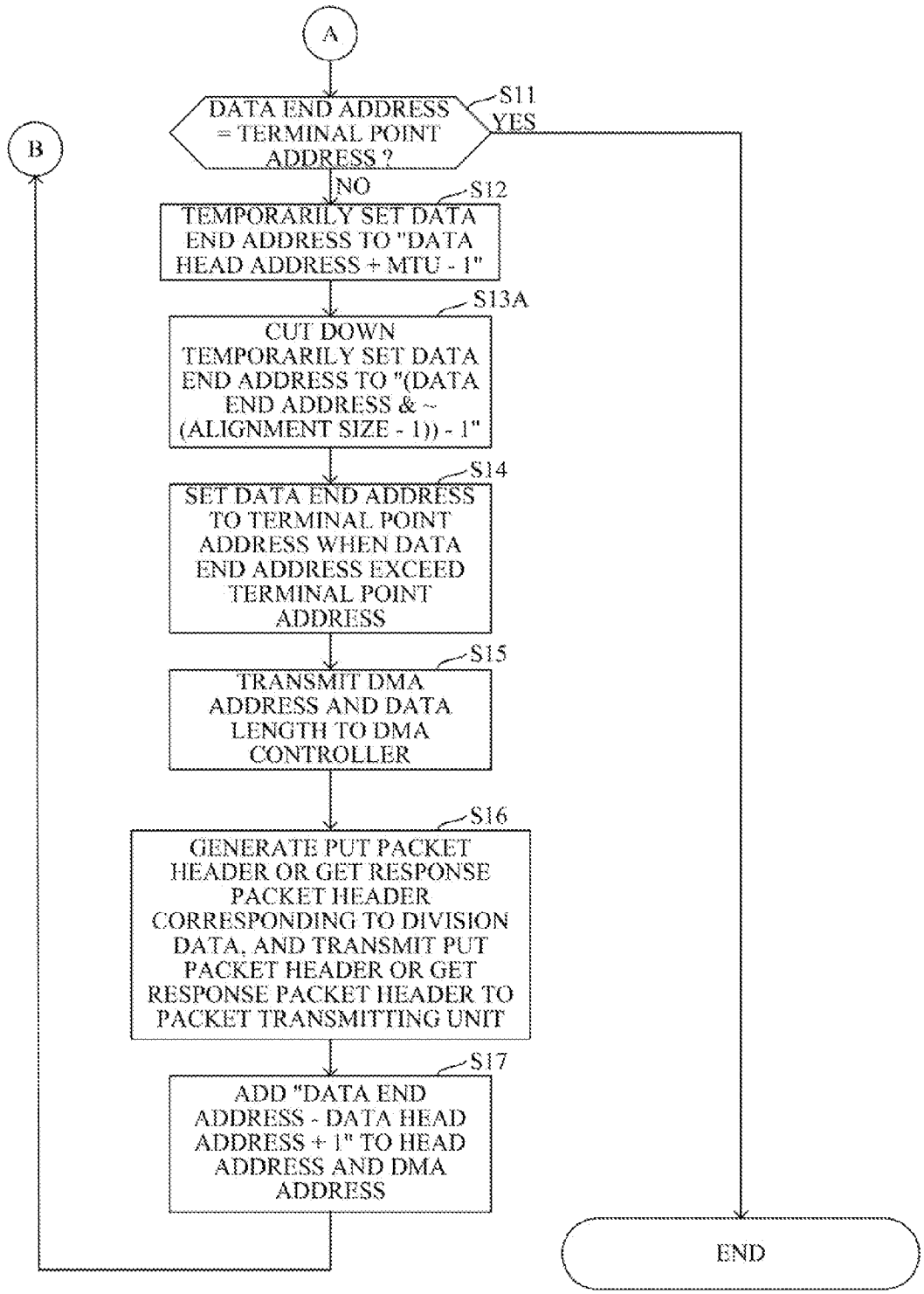

FIGS. 11A and 11B are a flowchart illustrating a process executed by the division location calculating unit 22. It should be noted that steps that are the same as the steps illustrated in FIGS. 6A and 6B are designated by identical reference numerals, and description of the steps is omitted.

The division location calculating unit 22 cuts down the data end address temporarily set by step S12 to "(data end address &~(alignment size−1))−1" (step S13A). Here, "&" is the operator that executes AND operation in each bit, and "~" is the operator that executes NOT operation in each bit. According to step S13A, the data end address becomes a value acquired by subtracting "1" from a multiple of the alignment size, and hence subsequent division data can be aligned according to alignment boundaries (e.g. by 128 bytes).

FIG. 12 is a diagram illustrating a division method of data when the alignment type is the remote node in the Put communication.

In FIG. 12, it is assumed that the DMA transfer unit of the local node is 128 bytes, and the DMA transfer unit of the remote node is 256 bytes. When the data is divided according to the MTU, the data area of the head packet 1 is an address range 40 to 551. Since the transfer starting address of the remote node is 88, data is written in an area of the address range 88 to 599. The division location calculating unit 22 cuts down the end of the data area so that the end of the data area becomes "multiple of alignment size−1" on the main memory in the remote node. Here, since the alignment size of the remote node is 384 bytes, the division location calculating unit 22 cuts down the data area on the main memory in the local node to an address range 40 to 335 so that the data area on the main memory in the remote node becomes an address range 88 to 383. Thereby, the data area of a subsequent packet 2 begins from an address 384 on the main memory in the remote node, and the packet 2 is aligned according to the alignment boundaries (e.g. by 384 bytes). Then, the division location calculating unit 22 divides the data so that the end of the data area becomes "multiple of alignment size of remote node−1" on the main memory in the remote node. Here, the alignment size of the remote node is a multiple of the DMA transfer unit of the local node. Therefore, when the data is divided according to the alignment size, the end of the data area becomes "multiple of alignment size of remote node−1". The division location calculating unit 22 divides the data areas of the packets 2 and 3 into an address range 336 to 719 and an address range 720 to 1103, respectively, according to the alignment size of the remote node. The data area of a packet 4 is a range from an address 1104 to an address 1387. According to this division method, data other than the head and end packets is align on the main memory in the remote node according to the alignment boundaries (e.g. by 384 bytes), and hence the data can be effectively written in the main memory of the remote node.

It should be noted that a data division method in the Get communication is the same as the data division method in the Put communication except for the following points, i.e., (1) the network interface apparatus 2 near the remote node calculates the divisional locations of the data, and (2) the divisional locations of the data are calculated based on the field values of the Get request packet.

As described above, according to the second embodiment, even when the alignment sizes of the main memories in the local node and the remote node differ from each other, the data to be transferred can be aligned according to the alignment boundaries of the specified size.

Third Embodiment

The third embodiment differs from the first embodiment in that the network interface apparatus 2 near the local node calculates the divisional locations of the data of the Get communication, and the network interface apparatus 2 near the remote node omits calculating the divisional locations of the data of the Get communication. The third embodiment is applied to each node such as the information processing apparatus executing the inter-node communication. Since the network interface apparatus 2 near the remote node omits calculating the divisional locations of the data of the Get communication, the network interface apparatus 2 near the remote node may not include the division location calculating unit 22. Also, in the third embodiment, the division location calculating unit 22 near the local node calculates the divisional locations of the data based on a received Get descriptor. The packet transmitting unit 23 transmits the divisional locations of the data to the network interface apparatus 2 near the remote node by using the Get request packet.

Figure 13:
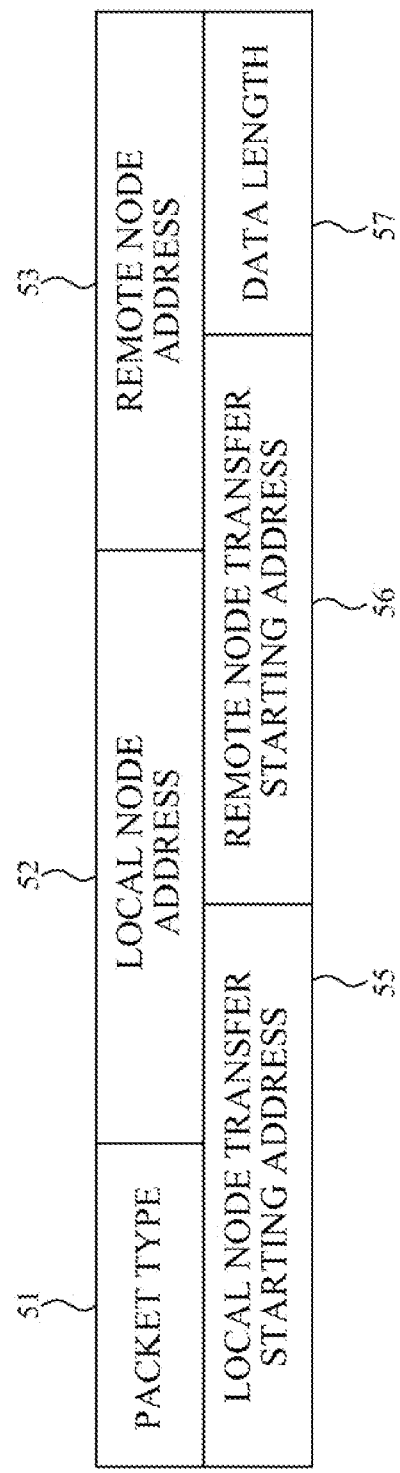
FIG. 13 is a diagram illustrating a format of the Get request packet according to a third embodiment.

FIG. 13 is a diagram illustrating a format of the Get request packet according to the third embodiment.

The Get request packet of FIG. 13 includes fields of a packet type 51, a local node address 52, a remote node address 53, a local node transfer starting address 55, a remote node transfer starting address 56, and a data length 57. The description of each field is the same as the description of FIG. 5, and is therefore omitted.

Figure 14:
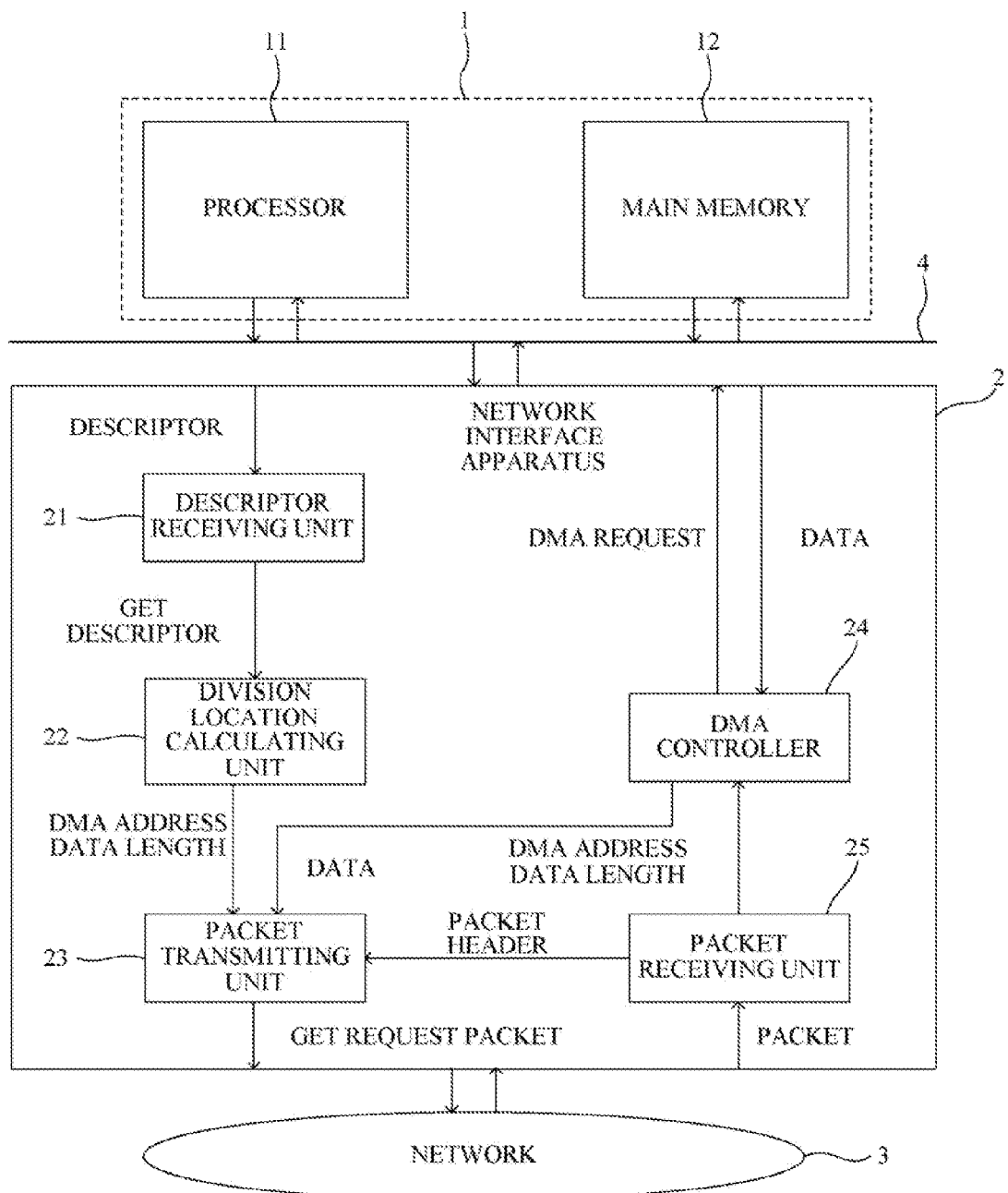
FIG. 14 is a diagram illustrating a construction of the network interface apparatus.

FIG. 14 is a diagram illustrating the construction of the network interface apparatus 2 according to the third embodiment.

The construction of the network interface apparatus 2 in FIG. 14 is the same as the construction of the network interface apparatus 2 in FIG. 3. However, the network interface apparatus 2 in FIG. 14 differs from the network interface apparatus 2 in FIG. 3 in that the packet receiving unit 25 does not transmit the Get request packet to the division location calculating unit 22.

In FIG. 14, the packet receiving unit 25 directly specifies the divisional locations of the Get response packet based on the remote node transfer starting address and the data length of the Get request packet. Therefore, the packet receiving unit 25 need not transmit the Get request packet to the division location calculating unit 22, transmits the remote node transfer starting address and the data length to the DMA controller 24 as it is, and transmits the header of the Get response packet to the packet transmitting unit 23.

The descriptor receiving unit 21 receives values of the fields of the local node transfer starting address, the remote node transfer starting address, the data length and the alignment type in the Put descriptor or the Get descriptor, and transmits the values to the division location calculating unit 22.

When the division location calculating unit 22 near the local node receives each field value of the Get descriptor in the Get communication, the division location calculating unit 22 calculates the divisional locations of the data based on the field values, and transmits the DMA address and the data length of each division data to the packet transmitting unit 23. The packet transmitting unit 23 creates the Get request packet from the DMA address and the data length, and transmits the Get request packet to the network interface apparatus near the remote node.

The packet receiving unit 25 in the network interface apparatus 2 near the remote node receives the Get request packet, and transmits the DMA address and the data length in the Get request packet to the DMA controller 24. Moreover, the packet receiving unit 25 transmits the header of the Get response packet to the packet transmitting unit 23. The DMA controller 24 reads out each division data from the main memory 12 based on the DMA address and the data length, and transmits each division data to the packet transmitting unit 23. The packet transmitting unit 23 creates the Get response packet from each received division data by using the header of the Get response packet, and transmits the Get response packet to the local node. Thus, the network interface apparatus 2 near the local node calculates the divisional locations of the data, so that the network interface apparatus 2 near the remote node can omit calculating the divisional locations of the data.

Figure 15:
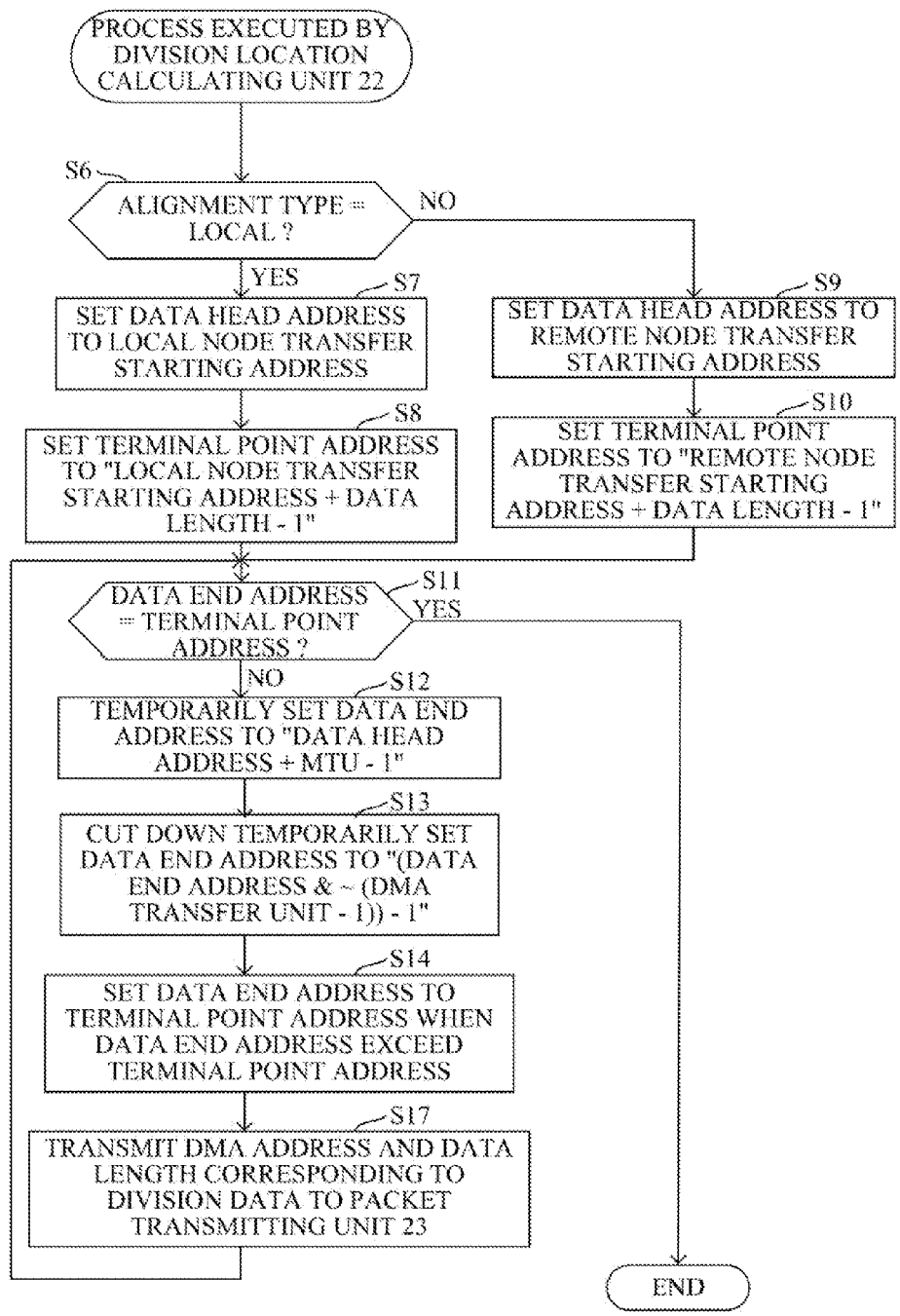
FIG. 15 is a flowchart illustrating a process executed by the division location calculating unit of the local node.

FIG. 15 is a flowchart illustrating a process executed by the division location calculating unit 22 of the local node. Steps that are the same as the steps illustrated in FIGS. 6A and 6B are designated by identical reference numerals, and description of the steps is omitted.

In FIG. 15, the division location calculating unit 22 calculates the divisional locations of the data so that the divisional locations of the data on the main memory of the node specified by the field of the alignment type of the descriptor in the Get communication become the alignment boundaries (steps S6 to S14). After the procedure of step S14, the division location calculating unit 22 transmits the DMA address and the data length corresponding to the division data to the packet transmitting unit 23 (step S18). The procedure returns to step S11. Here, the packet transmitting unit 23 creates the Get request packet from the received DMA address and the received data length, and transmits the Get request packet to the network interface apparatus 2 near the remote node. Thus, each of the divisional locations of the data is transmitted to the network interface apparatus 2 near the remote node by the Get request packet, so that the network interface apparatus 2 near the remote node can omit calculating the divisional locations of the data.

A calculation method of the divisional locations which the network interface apparatus 2 near the local node executes is the same as the calculation method of the divisional locations which the network interface apparatus 2 near the remote node of the first embodiment executes, except for receiving value of each field from the Get descriptor. Also, in the third embodiment, the calculation method of the divisional locations in the case of the Put communication is the same as the calculation method of the divisional locations in the case of the Put communication of the first embodiment.

As described above, according to the third embodiment, the network interface apparatus 2 near the remote node can omit calculating the divisional locations of the data.

A computer or a network interface apparatus may execute a software program for realizing the functions of the network interface apparatus 2. In this manner, the same effects as those of the above-mentioned first to third embodiments can also be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A communication apparatus that is connected to a second information processing apparatus that transmits data requested from a first information processing apparatus, the communication apparatus comprising:

a receiving portion that, when the requested data stored into another main memory in the second information processing apparatus is read, receives alignment specifying information from the another main memory included in the second information processing apparatus, the alignment specifying information indicating which of a main memory included in the first information processing apparatus and the another main memory included in the second information processing apparatus to align the requested data, and the alignment specifying information being provided so that a processor in the second information processing apparatus is capable of selecting which address of the main memory included in the first information processing apparatus and the another main memory included in the second information processing apparatus to align the requested data;

a division location calculating portion that calculates a divisional location of the requested data so that the divisional location of the requested data becomes an alignment boundary on any one of the main memory included in the first information processing apparatus and the another main memory included in the second information processing apparatus specified by the received alignment specifying information, the alignment boundary being integral multiples of a cache line; and a transmitting portion that divides the requested data stored into the another main memory in the second information processing apparatus based on the calculated divisional location, and transmits the divided data to the first information processing apparatus, wherein the division location calculating portion cuts down an end address of data to be transmitted by a first data transmission to a value acquired by subtracting one from a multiple of the cache line.

2. The communication apparatus according to claim 1, wherein the alignment specifying information is included in a descriptor of Put communication or a request packet of Get communication corresponding to a descriptor of Get communication in RDMA communication.

3. The communication apparatus according to claim 2, wherein the descriptor of the Put communication or the request packet of the Get communication includes alignment size information indicating a size of the alignment boundary on any one of the main memory included in the first information processing apparatus and the another main memory included in the second information processing apparatus specified by the received alignment specifying information, and the division location calculating portion calculates the divisional location of the requested data so that the divisional location of the requested data becomes the alignment boundary specified by the alignment size information on any one of the main memory included in the first information processing apparatus and the another main memory included in the second information processing apparatus specified by the received alignment specifying information.

4. The communication apparatus according to claim 2, wherein
the calculated divisional location is transmitted by the request packet of the Get communication.

5. The communication apparatus according to claim 3, wherein
the calculated divisional location is transmitted by the request packet of the Get communication.

6. An information processing apparatus for transmitting data requested from another information processing apparatus, comprising:
a processor;
a main memory that stores the requested data;
a receiving portion that, when the requested data stored into the main memory is read, receives alignment specifying information from the main memory, the alignment specifying information indicating which of a main memory included in the information processing apparatus and another main memory included in the another information processing apparatus to align the requested data, and the alignment specifying information being provided so that the processor is capable of selecting which address of the main memory included in the information processing apparatus and the another main memory included in the another information processing apparatus to align the requested data;

a division location calculating portion that calculates a divisional location of the requested data so that the divisional location of the requested data becomes an alignment boundary on any one of the main memory included in the first information processing apparatus and the another main memory included in the second information processing apparatus specified by the received alignment specifying information, the alignment boundary being integral multiples of a cache line; and a transmitting portion that divides the requested data based on the calculated divisional location, and transmits the divided data to the another information processing apparatus, wherein the division location calculating portion cuts down an end address of data to be transmitted by a first data transmission to a value acquired by subtracting one from a multiple of the cache line.

7. A method for controlling a communication apparatus that is connected to a second information processing apparatus that transmits data requested from a first information processing apparatus, the method comprising:
receiving, when the requested data stored into another main memory in the second information processing apparatus is read, alignment specifying information from the another main memory included in the second information processing apparatus, the alignment specifying information indicating which of a main memory included in the first information processing apparatus and the another main memory included in the second information processing apparatus to align the requested data and the alignment specifying information being provided so that a processor in the second information processing apparatus is capable of selecting which address of the main memory included in the first information processing apparatus and the another main memory included in the second information processing apparatus to align the requested data;

calculating a divisional location of the requested data so that the divisional location of the requested data becomes an alignment boundary on any one of the main memory included in the first information processing apparatus and the another main memory included in the second information processing apparatus specified by the received alignment specifying information, the alignment boundary being integral multiples of a cache line; and dividing the requested data stored into the another main memory in the second information processing apparatus based on the calculated divisional location, and transmitting the divided data to the first information processing apparatus, wherein the calculating includes cutting down an end address of data to be transmitted by a first data transmission to a value acquired by subtracting one from a multiple of the cache line.

8. The communication apparatus according to claim 1, wherein when data stored into the main memory included in the first information processing apparatus is written in the second information processing apparatus, the transmitting portion transmits another alignment specifying information to the first information processing apparatus, the another alignment specifying information indicating which of the main memory included in the first information processing apparatus and the another main memory included in the second information processing apparatus to align the data, and the another alignment specifying information being provided so that a processor in the first information processing apparatus is capable of selecting which address of the main memory included in the first information processing apparatus and the another main memory included in the second information processing apparatus to align the data.

9. The information processing apparatus according to claim 6, wherein when data stored into the another main memory included in the another information processing apparatus is written in the information processing apparatus, the transmitting portion transmits another alignment specifying information to the another information processing apparatus, the another alignment specifying information indicating which of the main memory included in the information processing apparatus and the another main memory included in the another information processing apparatus to align the data, and the another alignment specifying information being provided so that a processor in the another information processing apparatus is capable of selecting which address of the main memory included in the information processing apparatus and the another main memory included in the another information processing apparatus to align the data.

10. The method for controlling the communication apparatus communication apparatus according to claim 7, wherein when data stored into the main memory included in the first information processing apparatus is written in the second information processing apparatus, the transmitting transmits another alignment specifying information to the first information processing apparatus, the another alignment specifying information indicating which of the main memory included in the first information processing apparatus and the another main memory included in the second information processing apparatus to align the data, and the another alignment specifying information being provided so that a processor in the first information processing apparatus is capable of selecting which address of the main memory included in the first information processing apparatus and the another main memory included in the second information processing apparatus to align the data.

\* \* \* \* \*